United States Patent
Coustal et al.

(10) Patent No.: US 9,497,105 B2
(45) Date of Patent: Nov. 15, 2016

(54) NODE, MESH COMMUNICATION NETWORK AND ROUTING RECONFIGURATION METHOD

(71) Applicant: THALES, Neuilly sur Seine (FR)

(72) Inventors: Pierre Coustal, Pessac Cedex (FR); Franck Tailliez, Pessac Cedex (FR)

(73) Assignee: THALES, Neuilly sur Seine (FR)

( * ) Notice: Subject to any disclaimer, the term of this patent is extended or adjusted under 35 U.S.C. 154(b) by 76 days.

(21) Appl. No.: 14/267,407

(22) Filed: May 1, 2014

(65) Prior Publication Data

US 2014/0328216 A1    Nov. 6, 2014

(30) Foreign Application Priority Data

May 2, 2013    (FR) ...................... 13 01023

(51) Int. Cl.
*H04L 12/751* (2013.01)
*H04L 12/723* (2013.01)
*H04L 12/773* (2013.01)

(52) U.S. Cl.
CPC ............. *H04L 45/02* (2013.01); *H04L 45/50* (2013.01); *H04L 45/60* (2013.01)

(58) Field of Classification Search
None
See application file for complete search history.

(56) References Cited

U.S. PATENT DOCUMENTS

| | | | | |
|---|---|---|---|---|
| 5,014,262 | A * | 5/1991 | Harshavardhana | 370/237 |
| 5,088,091 | A * | 2/1992 | Schroeder et al. | 370/406 |
| 5,138,615 | A * | 8/1992 | Lamport et al. | 370/400 |
| 6,819,662 | B1 * | 11/2004 | Grover et al. | 370/351 |
| 7,184,396 | B1 * | 2/2007 | Li | 370/225 |
| 2002/0067720 | A1 | 6/2002 | Garcia-Una-Aceves et al. | |
| 2011/0317710 | A1 | 12/2011 | Tessier et al. | |
| 2014/0192677 | A1* | 7/2014 | Chew et al. | 370/254 |

FOREIGN PATENT DOCUMENTS

EP    2 337 284    6/2011

OTHER PUBLICATIONS

French Search Report dated Nov. 19, 2013, from corresponding French Application No. 1301023.

* cited by examiner

*Primary Examiner* — Chi H Pham
*Assistant Examiner* — Shick Hom
(74) *Attorney, Agent, or Firm* — Troutman Sanders LLP

(57) ABSTRACT

The invention relates to a module equipping a node of a mesh communication network, identified on the network by a logic number and including an input and/or output port, which is characterized by configuration data for the network, including data corresponding to an adjacency matrix of the network and data corresponding to the logic numbers of the neighboring network nodes of the considered node; and a computation device capable of computing a routing vector from the configuration data, the routing vector being intended to be used by the input and/or output port for message routing.

14 Claims, 4 Drawing Sheets

NODE, MESH COMMUNICATION NETWORK AND ROUTING RECONFIGURATION METHOD

CROSS-REFERENCE TO RELATED APPLICATIONS

The present application claims priority from French Patent Application No. 13 01023, filed May 2, 2013. The entire content of which is incorporated herein by reference.

FIELD OF INVENTION

The present invention relates to mesh communication networks. It more particularly relates to methods and devices for reconfiguring routing, which allows messages to be conveyed within the network.

BACKGROUND

A mesh communication network, also called a point-to-point communication network, is made up of a plurality of nodes connected to each other by one-way or two-way links. The network includes N nodes, where N is any definite integer. The network is consequently finite and closed.

In such a network, the conveyance of a message between a source node and a recipient node uses intermediate nodes to relay the message and is based on a routing mechanism.

In general, whatever the nature of the hardware layer of the considered network, the problem of the robustness of the conveyance arises once the network is based on such a routing mechanism.

In order not to lose all or part of the communication service when a breakdown of one or more nodes and/or a rupture of one or more links occurs, or indeed to allow a functional need to be taken into account corresponding to the absence of one or more nodes, the topology of the network must necessarily have a certain degree of connectivity.

The connectivity of the network is a structural response to the need for robustness when one or more nodes or links disappear.

Thus, to obtain a network that is robust with respect to the disappearance of any subset, howsoever constituted, of p−1 nodes, it is necessary and sufficient for the graph corresponding to the network to be a p-connected graph.

Such a network then continues to provide the communication service between all of the remaining nodes for any group of p−1 missing nodes.

One necessary (but not sufficient) condition for a graph to be p-connected is that each of its nodes has at least p neighboring nodes, i.e., for it to be connected by two-way links to p other nodes of the network.

The complexity of the network increases with the total number N of nodes and the degree of connectivity of the network, i.e., the number of links between the nodes.

In a complex network, the question of routing proves to be a difficult problem to address, inasmuch as it is necessary to account for random changes of the network, such as the disappearance of one or more nodes or links.

In fact, if the routing function is not correctly thought out, it may lead to the total or partial loss of the communication service between the remaining nodes after a modification of the network, even when the remaining nodes retain a total structural connectivity to each other, of a nature to allow maintenance of the communication service.

In this context, the invention aims to offset these problems.

SUMMARY

To that end, the invention relates to a node, a network made up of such nodes and a method for reconfiguring the routing in such a network according to the claims.

The routing module of a node constitutes an elementary and generic device making it possible, when integrated into a node, to build any mesh communication network that has the characteristic of guaranteeing, under all circumstances, routing using 100% of the potential connectivity of the network, and always using the minimal routing path.

The expression "100% of the potential connectivity of the network" means that the routing between two nodes is assured once a path exists between those two nodes. The expression "minimum path" means that the path followed by the message between the source node and the recipient node passes through the smallest possible number of intermediate nodes.

Such a routing module may result from appropriate programming of a programmable logic circuit.

The invention and its advantages will be better understood upon reading the following description, provided solely as an illustration, of one example of a particular embodiment. This pertains to the production of a 3-connected mesh communication network.

BRIEF DESCRIPTION OF THE DRAWINGS

The detailed description is done in reference to the appended drawings, in which.

DETAILED DESCRIPTION

Network Structure

Figure 1:
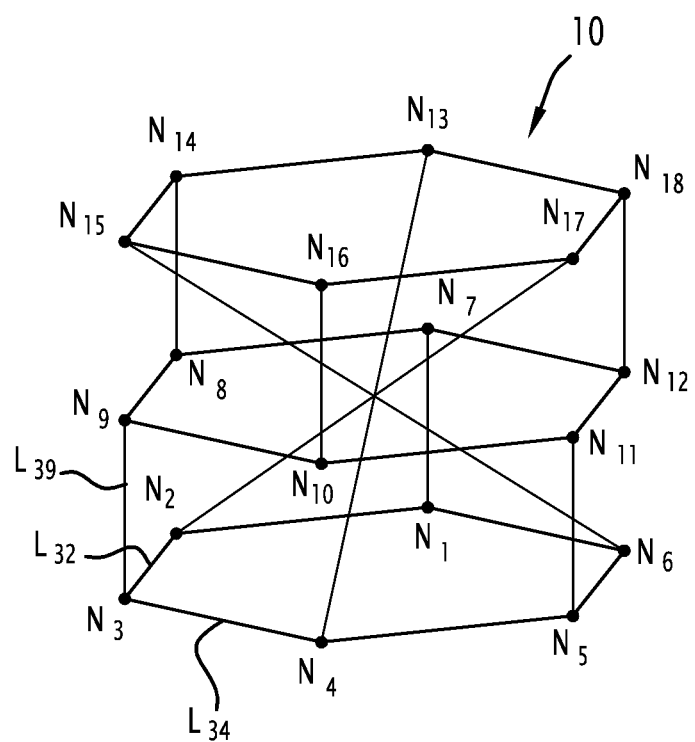
FIG. 1 is a graph corresponding to a 3-connected communication mesh network, in which each node $N_i$, where $i$ is an integer that is an absolute identifying logic number, is connected by three links to three other nodes, called neighboring nodes, and each link is labeled with the logic numbers of the two nodes that it connects.

FIG. 1 shows, in the form of a graph, a mesh communication network 10 made up of eighteen nodes and twenty-seven two-way links. The network 10 is finite and closed.

Each node is identified by the letter N followed by an integer i corresponding to an absolute identifying logic number of the node on the network 10.

Each link is identified by the letter L followed by logic numbers for the two nodes connected to each other via that link. Thus, the link Lij connects the nodes $N_i$ and $N_j$. In FIG. 1, only the links from the node $N_3$ have been identified for reasons of clarity.

Each node $N_i$ is connected to three neighboring nodes $N_k$, $N_l$ and $N_m$, such that the network 10 is 3-connected.

The maximum distance between any two nodes $N_i$ and $N_j$ of the network 10 is four hops. The mesh made up of six nodes represents the distance of the shortest cycle that may be built within the network 10.

The nodes are capable of exchanging with each other communication messages, which are transmitted over the links.

In the particular example described here in detail, the network 10 is an integral part of a modular system in which each node $N_i$ constitutes a connection point for an application module 20 of said modular system.

The network 10 is robust with respect to any double failure of node(s) and/or link(s): all of the nodes $N_i$ remain accessible with respect to one another if any two links are eliminated (in either or both directions), any two nodes or any one node and one link, in the network 10. Furthermore, after modification of the network 10, there is at least one path allowing messages to be exchanged between a source node and a recipient note.

Node Structure

Figure 2:
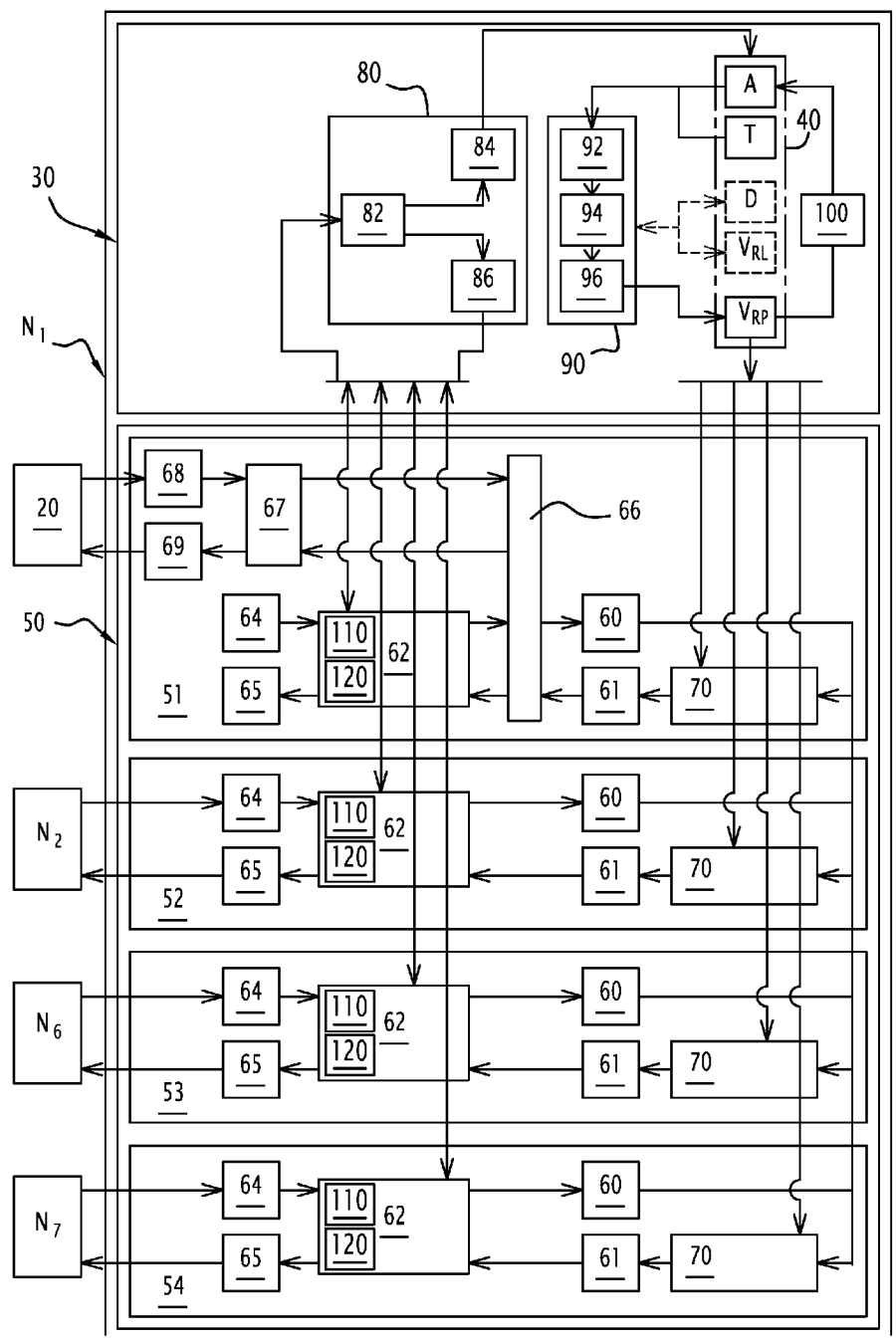
FIG. 2 is a diagrammatic illustration, in the form of a block diagram, of a node of the network of FIG. 1, that node including an input/output module 50 having one 'internal' input/output port 51 and three 'external' input/output ports 52 to 54 that are connected to other nodes in the network and a routing module.

As illustrated in FIG. 2 for the particular case of the node $N_1$, each node $N_i$ of the network 10 includes an input/output module 50 and a routing module 30.

The input/output module 50 includes four input/output ports, including one so-called 'internal' input/output port 51 that is connected to an application module 20. The other ports 52 to 54, which are called 'external', are connected to other nodes of the network 10, which are the neighboring nodes of the considered node when the links connecting them are in the active state.

Each of the ports 51 to 54 includes a switch 70, an input buffer memory, such as a FIFO input 60, an output buffer memory, such as a FIFO output 61, a link management module 62, an input coupler 64, for example a serializer, and an output coupler 65, for example a deserializer.

Preferably, the internal port 51 includes a selection mechanism 66 capable of coupling the input 60 and output 61 FIFOs either to the input 64 and output 65 couplers, or to input 68 and output 69 host couplers, using a controller 67.

The internal port 51 is thus useable as a gateway. To exchange operational messages with the application module 20, the input 64 and output 65 couplers are deactivated and the input 68 and output 69 host couplers are activated.

Configured as a gateway, the input 68 and output 69 host couplers are deactivated and the input 64 and output 65 couplers are activated. This makes it possible to connect the port 51 to another node, also configured as a gateway, belonging to another network. Configuration properties relative to each of the two networks thus connected and, in particular, the adjacency matrix A, are not exchanged by these gateways, such that each network sees the other as a remote group of nodes.

Each node $N_i$ performs a local switching function between its different input/output ports in order to organize the ordering of message traffic and guarantee the flow in the network 10.

This switching function is performed by the four switches 70 of the ports 51 to 54.

The switches 70 are independent with respect to one another.

The switch 70 of one port is attached to the output FIFO 61 of the port. The switch 70 of one port is connected to a shared bus on which the four input FIFOs 60 of the different ports of the node are also connected.

An operational message includes a header portion indicating the logic number of the final recipient node of the message.

Within a same node, an operational message placed in an input FIFO of a port, called the 'input' port, is copied into the output FIFO of the port, called 'output' port, which is selected as a function of the logic number of the final recipient node and a physical routing vector $V_{RP}$.

The transfer of an operational message from an input FIFO of the input port to the output FIFO of the output port is subject to the "FIFO ALMOST FULL" signal of the output FIFO of the output port. This control mechanism is performed by the switch 70 of the output port.

A rotating priority mechanism between the ports is implemented by the switches 70. Each of them cyclically tests the input FIFOs of the various ports to verify whether they contain operational messages intended for the output port of the output FIFO for which the considered switch 70 is responsible.

Thus, each operational message filed in first place in an input FIFO of an input port waits for a place to be freed up in the output FIFO of an output port during at most one elementary cycle. This cycle is defined as the transfer time for an operational message with a maximum size between two neighboring nodes.

The link management module 62 of one port includes a detection module 110 and a service module 120.

The detection module 110 is capable of determining, in real time, the status of the link connected on the input/output couplers 64 and 65 or on the input/output host couplers 68 and 69. The detection module 110 is capable of transmitting so-called 'internal' configuration information relative to the link status, to a configuration management module 80 that will be described below.

More specifically, the module 110 of a downstream node $N_i$ detects the appearance or disappearance of a link with an upstream node $N_j$ neighboring the node $N_i$ by exchanging hardware information. To establish a link, when two neighboring nodes detect each other as going from the non-connected state to the connected state, i.e., switching of the link connecting them from the inactive state to the active state, the modules 110 of two nodes exchange the logic numbers thereof. Similarly, when a module 110 detects the disappearance of the incoming link, it enters the non-connected state.

The module 110 is capable of filtering the state changes of the link, in order to reject any parasitic phenomena that may lead to untimely detections. The filtering consists in particular, during switching of the link from the inactive state to the active state, of observing the maintenance of the link in a stable active state, during a predetermined length of time.

The module 110 is capable of transmitting the state changes of the link as internal configuration information to the configuration module 80.

Once the corresponding link is active, the management module 62 for that link controls the flow of messages using a disengageable mechanism according to the following principle: between two nodes, the transfer of a message from an output port of an upstream node $N_j$ to the input port of a downstream node $N_i$ is subject to the "FIFO ALMOST FULL" signal of the input FIFO of the input port of the downstream node $N_i$.

The service module 120 is capable of identifying a service message in the incoming message flow. An incident service message includes configuration information on the state of the network links. The service module 120 is capable of extracting configuration information from a service message and sending it, as external configuration information, to the configuration module 80.

The module 120 is also capable of inserting a service message coming from the configuration module 80 into the outgoing message flow, between two operational messages.

The routing module 30 includes a means 40 for storing attributes including configuration parameters, intermediate parameters and a physical routing vector.

The routing module 30 includes a computation means 90 capable of computing the physical routing vector from the configuration parameters.

The routing module 30 includes a cleaning means 100 capable of cleaning the configuration parameters used to compute the routing vector.

The routing module 30 includes a configuration means 80 capable of updating the configuration parameters of the considered node and transmitting configuration information to the other nodes of the network via the module 120.

Definition of properties T, A, D, $V_{RL}$ and $V_{RP}$

The storage means 40 includes:
- a table of neighbors T, which indicates the logic number k, l or m of the neighboring nodes $N_k$, $N_l$ and $N_m$ of the considered node $N_i$, i.e., the nodes of the network that are directly connected to a port of the node $N_i$;
- an adjacency matrix A, which indicates the current topology of the network 10;
- a matrix of distances D, which indicates the distance between two nodes of the network 10;
- a logic routing vector $V_{RL}$, which indicates, for each final recipient node of a message emitted by the considered node $N_i$, the logic number k, l or m of the neighboring node $N_k$, $N_l$ and $N_m$ to which that message is to be sent;
- a physical routing vector $V_{RP}$, which indicates, for each final recipient node of a message transmitted by the considered node $N_i$, the port of the node $N_i$ to which is connected the neighboring node $N_k$, $N_l$ and $N_m$ to which that message is to be sent.

The adjacency matrix A of a network with N nodes is a matrix of dimensions N×N made up of 0 and 1. A non-diagonal element $A_{ij}$ whereof the value is equal to 1 indicates the existence of a link between the nodes $N_i$ and $N_j$.

By convention, in the rest of the document, the term $A_{ij}=1$ designates the link oriented from the node $N_j$ to the node $N_i$. For a two-way link, we have $A_{ij}=A_{ji}=1$.

Thus, for a non-oriented network, i.e., in which all of the links are two-way links, such as the network 10, the associated adjacency matrix A is symmetrical.

The matrix A associated with a p-regular non-oriented network with N nodes is a symmetrical matrix, made up of 0 and 1, and containing N×p values at 1.

The adjacency matrix A provides an unambiguous description of the network status. It provides a complete description of the network while only taking up a small amount of storage memory.

The adjacency matrix A of the network 10 is thus as follows:

$$\begin{pmatrix}
0 & 1 & 0 & 0 & 0 & 1 & 1 & 0 & 0 & 0 & 0 & 0 & 0 & 0 & 0 & 0 \\
1 & 0 & 1 & 0 & 0 & 0 & 0 & 0 & 0 & 0 & 0 & 0 & 0 & 0 & 1 & 0 \\
0 & 1 & 0 & 1 & 0 & 0 & 0 & 1 & 0 & 0 & 0 & 0 & 0 & 0 & 0 & 0 \\
0 & 0 & 1 & 0 & 1 & 0 & 0 & 0 & 0 & 0 & 0 & 1 & 0 & 0 & 0 & 0 \\
0 & 0 & 0 & 1 & 0 & 1 & 0 & 0 & 0 & 1 & 0 & 0 & 0 & 0 & 0 & 0 \\
1 & 0 & 0 & 0 & 1 & 0 & 0 & 0 & 0 & 0 & 0 & 0 & 1 & 0 & 0 & 0 \\
1 & 0 & 0 & 0 & 0 & 0 & 0 & 1 & 0 & 0 & 1 & 0 & 0 & 0 & 0 & 0 \\
0 & 0 & 0 & 0 & 0 & 0 & 1 & 0 & 1 & 0 & 0 & 0 & 1 & 0 & 0 & 0 \\
0 & 0 & 1 & 0 & 0 & 0 & 0 & 1 & 0 & 1 & 0 & 0 & 0 & 0 & 0 & 0 \\
0 & 0 & 0 & 0 & 0 & 0 & 0 & 0 & 1 & 0 & 1 & 0 & 0 & 0 & 1 & 0 \\
0 & 0 & 0 & 0 & 1 & 0 & 0 & 0 & 0 & 1 & 0 & 1 & 0 & 0 & 0 & 0 \\
0 & 0 & 0 & 0 & 0 & 0 & 1 & 0 & 0 & 0 & 1 & 0 & 0 & 0 & 0 & 1 \\
0 & 0 & 0 & 1 & 0 & 0 & 0 & 0 & 0 & 0 & 0 & 0 & 1 & 0 & 0 & 1 \\
0 & 0 & 0 & 0 & 0 & 0 & 0 & 1 & 0 & 0 & 0 & 1 & 0 & 1 & 0 & 0 \\
0 & 0 & 0 & 0 & 0 & 1 & 0 & 0 & 0 & 0 & 0 & 0 & 1 & 0 & 1 & 0 \\
0 & 0 & 0 & 0 & 0 & 0 & 0 & 0 & 1 & 0 & 0 & 0 & 1 & 0 & 1 & 0 \\
0 & 1 & 0 & 0 & 0 & 0 & 0 & 0 & 0 & 0 & 0 & 0 & 0 & 1 & 0 & 1 \\
0 & 0 & 0 & 0 & 0 & 0 & 0 & 0 & 0 & 1 & 1 & 0 & 0 & 0 & 1 & 0
\end{pmatrix}$$

The distance matrix D is a symmetrical matrix N×N for a network with N nodes, and of which each column (or each row) is associated with a node. Thus, each column $D_i$ of the matrix D indicates the distance, in number of hops, that separates the considered node $N_i$ from the other nodes $N_j$ of the network 10.

The distance matrix D is obtained simply from the matrix A, as will be described below.

The matrix D of the network 10 is as follows:

$$\begin{pmatrix}
0 & 1 & 2 & 3 & 2 & 1 & 1 & 2 & 3 & 4 & 3 & 2 & 4 & 3 & 2 & 3 & 2 & 3 \\
1 & 0 & 1 & 2 & 3 & 2 & 2 & 3 & 2 & 3 & 4 & 3 & 3 & 4 & 3 & 2 & 1 & 2 \\
2 & 1 & 0 & 1 & 2 & 3 & 3 & 2 & 1 & 2 & 3 & 4 & 2 & 3 & 4 & 3 & 2 & 3 \\
3 & 2 & 1 & 0 & 1 & 2 & 4 & 3 & 2 & 3 & 2 & 3 & 1 & 2 & 3 & 4 & 3 & 2 \\
2 & 3 & 2 & 1 & 0 & 1 & 3 & 4 & 3 & 2 & 1 & 2 & 2 & 3 & 2 & 3 & 4 & 3 \\
1 & 2 & 3 & 2 & 1 & 0 & 2 & 3 & 4 & 3 & 2 & 3 & 3 & 2 & 1 & 2 & 3 & 4 \\
1 & 2 & 3 & 4 & 3 & 2 & 0 & 1 & 2 & 3 & 2 & 1 & 3 & 2 & 3 & 4 & 3 & 2 \\
2 & 3 & 2 & 3 & 4 & 3 & 1 & 0 & 1 & 2 & 3 & 2 & 2 & 1 & 2 & 3 & 4 & 3 \\
3 & 2 & 1 & 2 & 3 & 4 & 2 & 1 & 0 & 1 & 2 & 3 & 3 & 2 & 3 & 2 & 3 & 4 \\
4 & 3 & 2 & 3 & 2 & 3 & 3 & 2 & 1 & 0 & 1 & 2 & 4 & 3 & 2 & 1 & 2 & 3 \\
3 & 4 & 3 & 2 & 1 & 2 & 2 & 3 & 2 & 1 & 0 & 1 & 3 & 4 & 3 & 2 & 3 & 2 \\
2 & 3 & 4 & 3 & 2 & 3 & 1 & 2 & 3 & 2 & 1 & 0 & 2 & 3 & 4 & 3 & 2 & 1 \\
4 & 3 & 2 & 1 & 2 & 3 & 3 & 2 & 3 & 4 & 3 & 2 & 0 & 1 & 2 & 3 & 2 & 1 \\
3 & 4 & 3 & 2 & 3 & 2 & 2 & 1 & 2 & 3 & 4 & 3 & 1 & 0 & 1 & 2 & 3 & 2 \\
2 & 3 & 4 & 3 & 2 & 1 & 3 & 2 & 3 & 2 & 3 & 4 & 2 & 1 & 0 & 1 & 2 & 3 \\
3 & 2 & 3 & 4 & 3 & 2 & 4 & 3 & 2 & 1 & 2 & 3 & 3 & 2 & 1 & 0 & 1 & 2 \\
2 & 1 & 2 & 3 & 4 & 3 & 3 & 4 & 3 & 2 & 3 & 2 & 2 & 3 & 2 & 1 & 0 & 1 \\
3 & 2 & 3 & 2 & 3 & 4 & 2 & 3 & 4 & 3 & 2 & 1 & 1 & 2 & 3 & 2 & 1 & 0
\end{pmatrix}$$

The matrix D indicates that the maximum distance between any two nodes of the network 10 is four hops.

The determination of a path in the network, i.e., of the ordered set of the nodes to be passed through to convey an operational message from a source node to a recipient node, is based on the Bellman dynamic programming principle, according to which any portion of an optimal path is itself optimal. Thus, it suffices for a source node $N_i$ to resend a message to the neighboring node that has the optimal path to the recipient node for the message. As it comes closer and closer, the message de facto follows the optimal path.

From a mathematical standpoint, the determination of the optimal path is based on the use of the distance matrix D. The distance matrix allows a node $N_i$ that must resend an operational message to a recipient node to select, from among its neighbors, that which has the optimal path, i.e., the shortest distance from the recipient node.

The selection is not done in real-time, but in a computation step of a routing vector, following a modification of the configuration of the network 10.

For each of the nodes, the logic routing vector $V_{RL}$ is a list associating the logic number of the neighboring node to which the message must be routed, with the logic number of a recipient node.

In matrix form, aggregating the logic routing vectors of each of the nodes of the network 10 in columns, we thus have:

$$\begin{pmatrix} 1 & 1 & 2 & 5 & 6 & 1 & 1 & 7 & 3 & 16 & 5 & 7 & 4 & 8 & 6 & 17 & 2 & 12 \\ 2 & 2 & 2 & 3 & 6 & 1 & 1 & 9 & 3 & 16 & 5 & 18 & 4 & 8 & 6 & 17 & 2 & 17 \\ 2 & 3 & 3 & 3 & 4 & 1 & 1 & 9 & 3 & 9 & 5 & 18 & 4 & 8 & 6 & 10 & 2 & 13 \\ 2 & 3 & 4 & 4 & 4 & 5 & 1 & 14 & 3 & 11 & 5 & 18 & 4 & 13 & 6 & 10 & 2 & 13 \\ 6 & 3 & 4 & 5 & 5 & 5 & 1 & 14 & 3 & 11 & 5 & 11 & 4 & 15 & 6 & 10 & 2 & 12 \\ 6 & 1 & 4 & 5 & 6 & 6 & 1 & 14 & 3 & 16 & 5 & 7 & 4 & 15 & 6 & 15 & 2 & 12 \\ 7 & 1 & 9 & 13 & 11 & 1 & 7 & 7 & 8 & 11 & 12 & 7 & 14 & 8 & 6 & 10 & 2 & 12 \\ 7 & 3 & 9 & 13 & 11 & 15 & 8 & 8 & 8 & 9 & 12 & 7 & 14 & 8 & 14 & 10 & 1 & 12 \\ 7 & 3 & 9 & 3 & 11 & 15 & 8 & 9 & 9 & 9 & 10 & 7 & 4 & 8 & 16 & 10 & 2 & 12 \\ 7 & 17 & 9 & 5 & 11 & 15 & 8 & 9 & 10 & 10 & 10 & 11 & 4 & 8 & 16 & 10 & 16 & 12 \\ 7 & 17 & 9 & 5 & 11 & 5 & 12 & 9 & 10 & 11 & 11 & 11 & 4 & 8 & 6 & 10 & 18 & 12 \\ 7 & 17 & 9 & 13 & 11 & 1 & 12 & 7 & 10 & 11 & 12 & 12 & 18 & 8 & 6 & 10 & 18 & 12 \\ 7 & 17 & 4 & 13 & 4 & 15 & 8 & 14 & 3 & 16 & 5 & 18 & 13 & 13 & 14 & 17 & 18 & 13 \\ 7 & 17 & 9 & 13 & 6 & 15 & 8 & 14 & 8 & 16 & 5 & 18 & 14 & 14 & 14 & 15 & 18 & 13 \\ 6 & 17 & 9 & 13 & 6 & 15 & 1 & 14 & 10 & 16 & 5 & 18 & 14 & 15 & 15 & 15 & 16 & 13 \\ 2 & 17 & 9 & 13 & 11 & 15 & 1 & 14 & 10 & 16 & 10 & 18 & 14 & 15 & 16 & 16 & 16 & 17 \\ 2 & 17 & 2 & 13 & 11 & 15 & 1 & 14 & 3 & 16 & 12 & 18 & 18 & 15 & 16 & 17 & 17 & 17 \\ 7 & 17 & 4 & 13 & 11 & 15 & 12 & 14 & 3 & 16 & 12 & 18 & 18 & 13 & 16 & 17 & 18 & 18 \end{pmatrix}$$

Defining, for each of the nodes of the network, a vector $V_{RL}$ guarantees routing by a path that is both minimal in distance and deterministic, for any initial source node/final recipient node pair.

The physical routing vector, used by the switch 70 of the different ports of the input/output means 50 of the node $N_i$, is obtained by replacing, in the logic routing vector $V_{RL}$, the logic number of the neighboring node $N_j$ with the number of the port to which the neighboring node $N_j$ is connected.

In a matrix form, aggregating the physical routing values of each of the nodes of the network 10 into columns, we thus have:

$$\begin{pmatrix} 1 & 3 & 3 & 2 & 2 & 2 & 4 & 3 & 4 & 4 & 4 & 2 & 4 & 4 & 4 & 2 & 4 & 4 \\ 2 & 1 & 3 & 3 & 2 & 2 & 4 & 1 & 4 & 4 & 4 & 4 & 4 & 4 & 2 & 4 & 3 \\ 2 & 2 & 1 & 3 & 3 & 2 & 4 & 2 & 4 & 3 & 4 & 4 & 4 & 4 & 4 & 4 & 4 & 2 \\ 2 & 2 & 2 & 1 & 3 & 3 & 4 & 4 & 4 & 2 & 4 & 4 & 4 & 3 & 4 & 4 & 4 & 2 \\ 3 & 2 & 2 & 2 & 1 & 3 & 4 & 4 & 4 & 2 & 4 & 3 & 4 & 2 & 4 & 4 & 4 & 4 \\ 3 & 3 & 2 & 2 & 2 & 1 & 4 & 4 & 4 & 4 & 2 & 4 & 2 & 4 & 3 & 4 & 4 & 4 \\ 4 & 3 & 4 & 4 & 4 & 2 & 1 & 3 & 3 & 2 & 2 & 2 & 4 & 4 & 4 & 4 & 4 & 4 \\ 4 & 2 & 4 & 4 & 4 & 4 & 2 & 1 & 3 & 3 & 2 & 2 & 2 & 4 & 3 & 4 & 4 & 4 \\ 4 & 2 & 4 & 3 & 4 & 4 & 2 & 2 & 1 & 3 & 3 & 2 & 4 & 4 & 2 & 4 & 4 & 4 \\ 4 & 4 & 4 & 2 & 4 & 4 & 2 & 2 & 2 & 1 & 3 & 3 & 4 & 4 & 2 & 4 & 3 & 4 \\ 4 & 4 & 4 & 2 & 4 & 3 & 3 & 2 & 2 & 2 & 1 & 3 & 4 & 4 & 4 & 4 & 2 & 4 \\ 4 & 4 & 4 & 4 & 4 & 2 & 3 & 3 & 2 & 2 & 2 & 1 & 3 & 4 & 4 & 4 & 2 & 4 \\ 4 & 4 & 2 & 4 & 3 & 4 & 2 & 4 & 4 & 4 & 4 & 1 & 3 & 3 & 2 & 2 & 2 \\ 4 & 4 & 4 & 4 & 2 & 4 & 2 & 4 & 3 & 4 & 4 & 4 & 2 & 1 & 3 & 3 & 2 & 2 \\ 3 & 4 & 4 & 4 & 2 & 4 & 4 & 4 & 2 & 4 & 4 & 4 & 2 & 2 & 1 & 3 & 3 & 2 \\ 2 & 4 & 4 & 4 & 4 & 4 & 4 & 2 & 4 & 3 & 4 & 2 & 2 & 2 & 1 & 3 & 3 \\ 2 & 4 & 3 & 4 & 4 & 4 & 4 & 4 & 4 & 2 & 4 & 3 & 2 & 2 & 2 & 1 & 3 \\ 4 & 4 & 2 & 4 & 4 & 4 & 3 & 4 & 4 & 4 & 2 & 4 & 3 & 3 & 2 & 2 & 2 & 1 \end{pmatrix}$$

Computation Method for the Routing Vector 90

The module 90 includes:

A sub-module 92 for computing columns of the distance matrix D that correspond to the logic numbers of the neighbors T, from the adjacency matrix A;

A sub-module 94 for determining a logic routing vector $V_{RL}$ from the columns of the distance matrix D obtained from the output of the sub-module 92; and A sub-module 96 for determining a physical routing vector $V_{RP}$ from the logic routing vector $V_{RL}$ obtained at the output of the sub-module 94.

The module 90 is capable of being executed following an update of the matrix A, as will be described later.

The execution of the module 90 begins with the execution of the sub-module 92 for computing the distance matrix D from the matrix A.

The sub-module 92 is capable of implementing an algorithm of this type in which the matrix A is considered a matrix of change of state.

In such an algorithm, a graph of N nodes is assumed, and a diagonal matrix $\gamma_0 = Id$ is initialized, in which all of the diagonal terms are equal to 1. The 1 terms of the diagonal represent tokens in the nodes of the network in the initial situation.

It is next assumed that, upon each iteration indexed by integer i, the tokens move in the network according to the links described by the adjacency matrix A.

Upon each iteration i, $AY_i$ gives the number and position of the tokens from the situation $Y_i$. In order to store the nodes passed through in the preceding hops, $Y_i$ is added to the result $AY_i$. Thus: $Y_{i+1} = (A+Id)Y_i = (A+Id)^k Y_0$ The term $D_{ij}$ of the matrix D is then equal to the hop k from which, when the term $(Y_{k-1})_{ij}$ is zero, the term $(Yk)_{ij}$ becomes non-zero.

Given that in a network with N nodes, there cannot be a simple path (i.e. a path without a cycle) greater than N–1 hops, it is possible to interrupt the algorithm when i is equal to N–1.

The terms $D_{ij}$ outside the main diagonal, i.e., such that i is different from j, which are zero at the end of the algorithm, mean that node $N_i$ is not reachable from node $N_j$. More generally, if we find permutations on the rows and columns of the matrix D that show independent non-zero diagonal blocks, we have a graph that is not connected, i.e., that corresponds to a network including disjointed sub-networks.

The following embodiment of the algorithm of the sub-module 92 provides a simple and quick method for sequentially computing only the columns j of the matrix D that correspond to the logic numbers of the neighbors indicated in the table T. In fact, a node $N_i$ only needs to compute the columns $D_j$ associated with its direct neighbors $N_j$ so as to determine their distances from all of the other nodes of the network.

```
1       for j=T(n)
2            for k=2 :N
3                 Vj=D( :,j)
4                 for i=1 :N
5                      if Vj(i)==0
6                           If max(Vj*A(i, :))>=1;
7                                D(i,j)=k;
8                           end
9                      end
10                end
11           end
12           D(j,j)=0;
13      end
```

The execution of the module 90 continues via the execution of the sub-module 94 once the sub-module 92 has computed the columns of the matrix D designated by T. The sub-module 94 is capable of computing the logic routing vector $V_{RL}$.

To that end, the sub-module 94 is capable of building, from results obtained at the output of the sub-module 92, a logic routing vector $V_{RL}$ associating the logic number of the direct neighbor having the smallest distance with respect to the recipient in question with each of the logic numbers of the recipients.

The execution of the module 90 continues through the execution of the sub-module 96 once the sub-module 94 has updated the logic routing vector $V_{RL}$. The sub-module 96 is capable of computing the physical routing vector $V_{RP}$.

To that end, the sub-module 96 is capable of replacing, in the updated logic routing vector $V_{RL}$, the logic number of the neighboring node with the number of the port of the considered node $N_i$ that is connected to that neighboring node.

The physical routing $V_{RP}$ thus updated is provided to the switches 70.

Means 100 for Cleaning the Matrix A

The update of the physical routing vector $V_{RP}$ leads to the execution of the module 100 for cleaning the adjacency matrix A. The module 100 allows the updated matrix A to be cleaned in order to eliminate all of the information relative to the network nodes that would not be accessible from the considered node $N_i$.

In fact, once the physical routing vector $V_{RP}$ has been computed, the zero values of the latter indicate that the corresponding nodes are not reachable from the considered node $N_i$.

The cleaning of the adjacency matrix A then consists of resetting all of the rows and columns of the matrix A that correspond to those unreachable nodes.

The justification for this operation lies in the fact that, by definition, the nodes of a first sub-network cannot be informed of modifications that occur on the nodes of a second sub-network which is disjointed from the first.

The cleaning therefore makes it possible to avoid any ambiguity that may occur when the two sub-networks, initially disjointed, discover each other during the establishment of a link between a node belonging to the first sub-network and a node belonging to the second sub-network.

The module 100 is consequently essential for proper management of the configuration of the network 10.

Means for Managing the Configuration 80

As shown in detail in FIG. 2, the means 80 for managing the configuration of the network 10 includes:
a sub-module 82 for filtering configuration information;
a sub-module 84 for updating the matrix A and the table T;
a sub-module 86 for propagating configuration information to the other nodes of the network 10.

The module 110 of a port sends internal configuration information to the module 80 and, more particularly, the filtering sub-module 82.

The module 120, on the one hand, sends external configuration information to the module 80, and more particularly, to the filtering sub-module 82.

The sub-module 82 filters the incident configuration information to verify whether it has already been taken into account.

If it has, this means that the configuration information has already been processed. There is no need to modify the matrix A or to propagate the information in the network, these actions having already been done during the first reception of that information.

If not, the configuration information is sent to the sub-module 84 for updating the matrix A and the table T and to the sub-module 86 for propagating configuration information.

The sub-module 84 then updates the list of neighbors T by removing the logic number of the neighboring node that is now not accessible or by adding the logic number of the newly accessible neighboring node.

The sub-module 84 updates the adjacency matrix A based on the configuration information transmitted to it by the sub-module 82.

If the state of the link $L_{ij}$ is now inactive, the element $A_{ij}=1$ of the matrix A is replaced by the element $A_{ij}=0$. Similarly, if the state of the link $L_{ij}$ is now active, the element $A_{ij}=0$ of the matrix A is replaced by the element $A_{ij}=1$.

The sub-module 86 for propagating configuration information then generates a service message intended for the neighboring nodes to share the current configuration of the network with them.

A service message indicates the modification of the state of a link between any two nodes of the network.

A service message is transmitted to the different management modules 62 of the ports of the considered node $N_i$, in order that that service message be re-transmitted by the sub-module 120 of each module 62.

This process for sending a service message does not use the routing means (switches 70, input 60 and output 61 FIFO) used for operational message exchanges. Service messages are thus exchanged at the hardware layer of the communication protocol used in the network 10. The configuration mechanism is therefore independent of the operational messages exchanged between the application modules 20.

With this mechanism, each node of the network propagates the configuration information to its immediate neighbors, such that the information relating to the modification of the state of any link of the network is rapidly propagated to the entire network 10. The complete propagation is done in Dmax hops. The topology and/or its variations are broadcast through the network in the reconfiguration phase thereof.

The means for managing the configuration 80 of each node $N_i$ gives the network 10 a self-discovery property, ensuring both its initialization and its reconfiguration.

In fact, the overall management of the configuration of the network 10 is done by the local management of each of the nodes. It allows the network to adapt itself to the disappearance or appearance of one or more links or nodes.

This property of adaptation having been acquired, it suffices to consider the successive loss of all of the nodes, then their reappearance in a random order to obtain the self-discovery property of the network.

Following each update of the matrix A, the module 90 for computing the routing vector is called to update the physical routing vector $V_{RP}$.

Between two reconfigurations, the routing vector is not modified. It is static. Thus, the routing done on the entire network is a static routing.

Logic Circuit

The preceding description is a functional description of the routing module. Different implementations can be considered.

For example, in one particularly advantageous embodiment, a programmable logic circuit, such as an FPGA (field-programmable gate array), is configured to implement the different means, modules and sub-modules described above.

Figure 3:
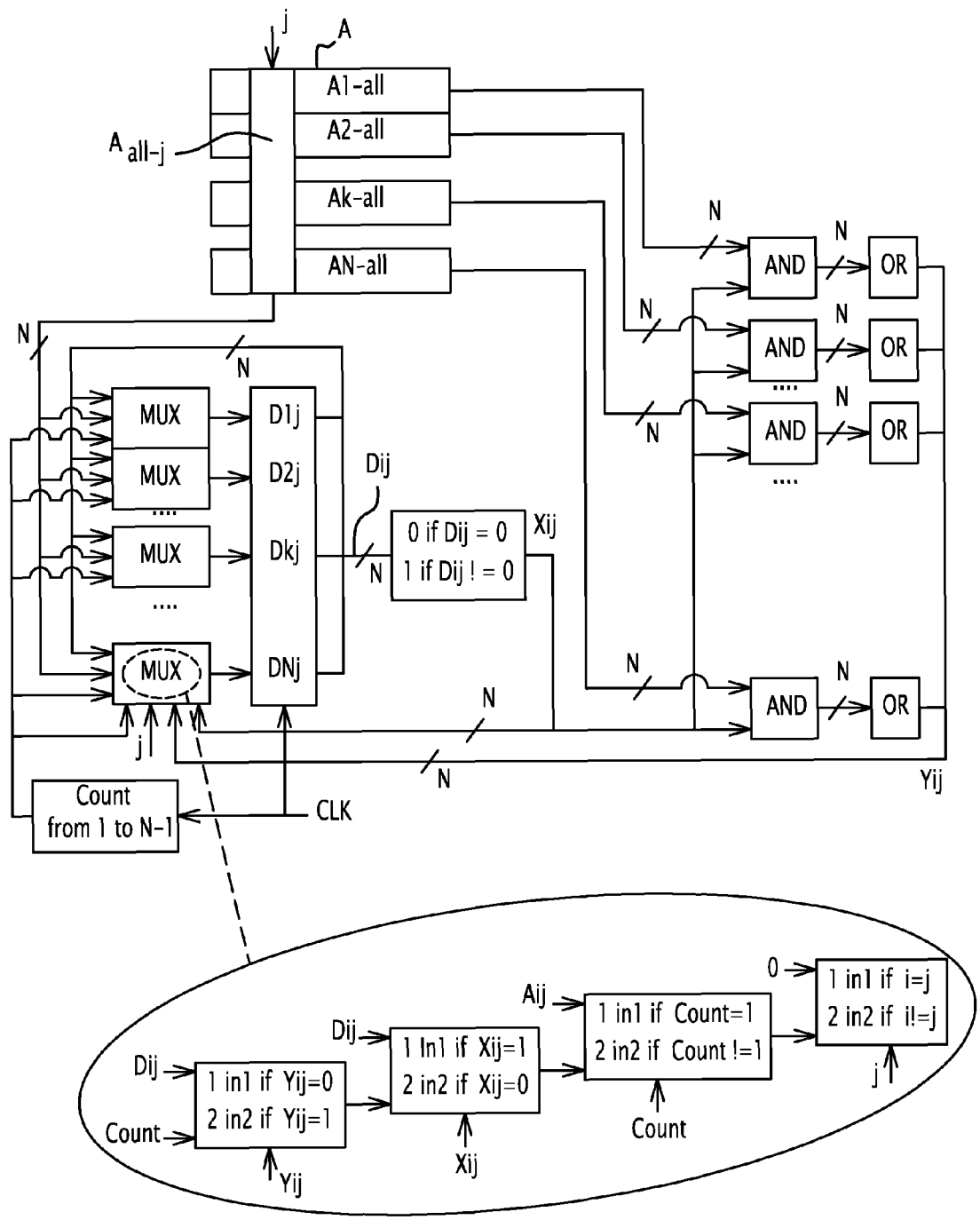
FIG. 3 is an illustration of a logic circuit making up an example of a means for computing a routing vector with which the routing module of the node of FIG. 2 is equipped.

FIG. 3 thus shows a logic circuit of the sequential type making it possible to compute the physical routing vector $V_{RP}$ from the adjacency matrix A.

The circuit of FIG. 3 produces the rows 2 to 12 of the algorithm shown above, limiting itself to computing the columns D of the matrix D corresponding only to the neighboring nodes j indicated in the table T.

For a node having p neighbors, the rows 1 to 13 of the algorithm shown above are done for a cycle of p consecutive activations of the logic circuit of FIG. 3.

Figure 4:
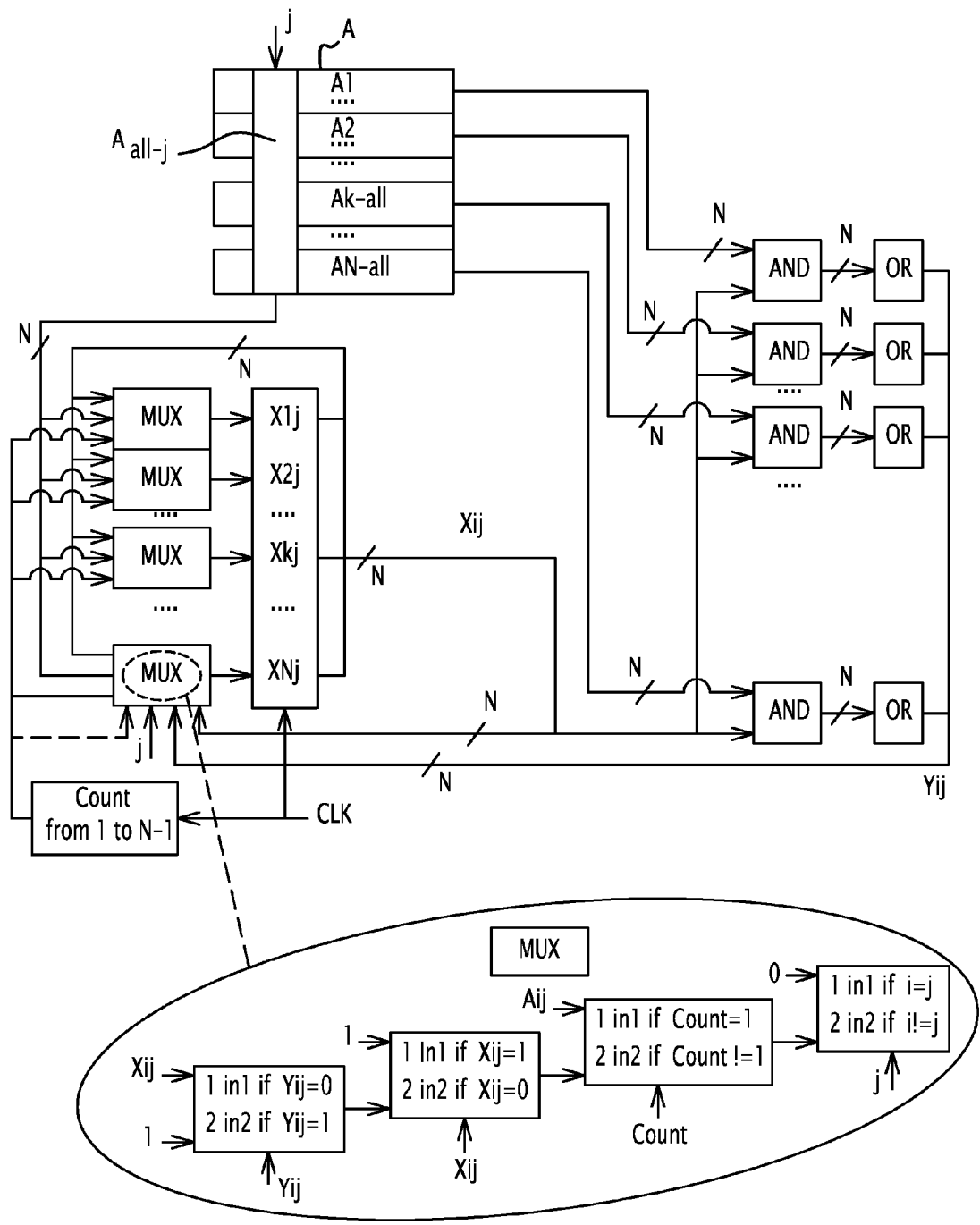
FIG. 4 is an illustration of a logic circuit making up another example of a means for computing a routing vector.

FIG. 4 shows a logic circuit of the parallel type allowing a computation of the physical routing vector $V_{RP}$ from the adjacency matrix A.

A logic circuit of the parallel type has the advantage of leading to the obtainment of the physical routing vector directly, i.e., without having to go through the intermediate configuration parameters. The implementation of such a circuit in a FPGA is simplified as a result.

The circuit must, however, be implemented p times in the FPGA, where represents the number of external ports of the node and, consequently, the maximum number of possible neighboring nodes.

Alternatively, any logic circuit resulting from a combination of logic circuits of the aforementioned sequential and parallel types may be considered.

It should be noted that for reasons of clarity in the description, it has been indicated that the module includes properties T, A, D, $V_{RL}$ and $V_{RP}$. In fact, only the adjacency matrix A and the physical routing vector $V_{RP}$ are strictly necessary. The matrix D and the vector $V_{RL}$ are computation intermediaries. The list T of neighbors may be deduced easily from the matrix A and the logic number of the considered node $N_i$.

Other implementations may be considered, in particular in the form of a computer program stored in the memory of a computer and the instructions of which are executable by a computation unit of the computer. Such an implementation in particular makes it possible to apply the invention to mesh networks that include a large number of nodes. The adjacency matrix may then be increased by one row and one column each time a new node appears on the network, without any particular constraint, other than the computation time for the routing vector during reconfiguration. This should be compared to the case of a hardware implementation, in which the logic circuit is for example configured to manage the configuration of the network including a maximum number of nodes, for example equal to 64 nodes.

The network of FIG. 1 is one particular example.

The reconfiguration method and the routing module allowing implementation of that method that have been described above are usable in any structurally robust mesh network, in particular in networks where the nodes do not have an identical number of ports.

A node may include at least one input port (well node), or at least one output node (source node), or input ports and/or output ports, several internal ports, etc.

The invention claimed is:

1. A node of a mesh communication network that includes a plurality of nodes connected by links, each node being identified on said network by a logic number, said node including an input or output port and a routing module, wherein said routing module comprises:

network configuration data comprising an adjacency matrix of said network, said adjacency matrix A being a matrix of size N×N, a non-diagonal element equals 1 when a link exists between a first node and a second node and 0 otherwise, and a table indicating the logic numbers of the neighboring network nodes of said node;

a computation device, executed each time the network is reconfigured and computing, from said adjacency matrix and said table, a routing vector, said routing vector being static and indicating, for each final recipient node of a message sent by said node, the port of said node to which the neighboring node to which said message is to be transmitted is connected, said routing vector being used by the input or output port to route messages; and a cleaning unit capable of cleaning the adjacency matrix, after said computation device has computed the routing vector from said configuration data.

2. The node according to claim 1, wherein said routing module further comprises a configuration management module capable of updating the configuration data based on a piece of configuration information relative to a state change of a link of said network.

3. The node according to claim 2, wherein said routing module further comprises a sending device capable of generating, based on the piece of configuration information relative to the state change of the link of the network, a configuration message intended to be transmitted to the input or output port and propagated on the network.

4. The node according to claim 2, wherein said routing module further comprises a filtering module capable of receiving a configuration message for the input or output port and generating configuration information.

5. The node according to claim 1, wherein the computation device of the routing module is of the sequential type and uses, as computation intermediary, all or part of a distance matrix.

6. The node according to claim 1, wherein the computation device of the routing module is of the parallel type.

7. The node according to claim 5, wherein the computation device is a combination of a sequential computation unit and a parallel computation unit.

8. The node according to claim 1, further comprising a programmable logic circuit, which is programmed to make up said routing module.

9. The node according to claim 1, further comprising an input or output internal port, designed to connect to an application module, the input or output port connected to another node of the network, being called an external port.

10. The node according to claim 9, further comprising a selection device converting the input or output port into an internal port or an external port.

11. The mesh communication network comprising a plurality of nodes connected by a plurality of links, wherein at least one node of said plurality of nodes is the node according to claim 9.

12. The network according to claim 11, wherein the network is static and reconfigurable.

13. A method for reconfiguring a static routing, implemented by nodes of a mesh communication network that includes nodes connected by links, each node of the network being identified on said network by a logic number and including a port, comprising the following steps:

providing from non-transient storage, for each node of the network, network configuration data comprising an adjacency matrix of said network, said adjacency matrix being a matrix with size N×N, a non-diagonal element of which is equal to 1 when a link exists between a first node and a second node and 0 otherwise, and a table indicating the logic numbers of the neighboring network nodes of said node;

computing, for each node of the network a routing vector from the adjacency matrix and the table of neighboring nodes, said routing vector being intended to be used by the at least one of input and output port of the considered node on a computation device; and cleaning, for each node of the network, the adjacency matrix, after the step for computing the routing vector.

14. The method according to claim 13, further comprising a configuration management step consisting of updating, at each node of the network, the configuration data for the considered node as a function of a piece of configuration information relative to a state change of a link of said network.

\* \* \* \* \*